United States Patent [19]

Zannis et al.

[11] Patent Number: 5,671,542

[45] Date of Patent: Sep. 30, 1997

[54] SIGNAL PROCESSING CIRCUIT FOR TRIGGER PROBE

[75] Inventors: James Zannis, Wotton-Under-Edge; David R. Whittle, Gloucester, both of England; David Ian Pilborough, Schaumburg, Ill.; Andrew James Harding, Almondsbury, England

[73] Assignee: Renishaw, PLC, Gloucestershire, United Kingdom

[21] Appl. No.: 582,890

[22] Filed: Jan. 4, 1996

Related U.S. Application Data

[63] Continuation of Ser. No. 331,654, filed as PCT/GB94/00548 Mar. 17, 1994, abandoned.

[30] Foreign Application Priority Data

Mar. 19, 1993 [GB] United Kingdom ............... 9305687

[51] Int. Cl.$^6$ ........................................... G01B 5/03
[52] U.S. Cl. ........................................... 33/561; 33/559
[58] Field of Search .................... 33/558, 561, 1 M, 33/503, 504, 505, 559

[56] References Cited

U.S. PATENT DOCUMENTS

| | | |
|---|---|---|
| 4,117,568 | 10/1978 | Werner et al. . |
| 4,153,998 | 5/1979 | McMurtry . |
| 4,270,275 | 6/1981 | McMurtry . |
| 4,364,180 | 12/1982 | Willhelm et al. . |
| 4,455,755 | 6/1984 | Fritsche et al. . |
| 4,702,013 | 10/1987 | McMurtry . |
| 4,769,919 | 9/1988 | Lloyd et al. . |
| 4,817,362 | 4/1989 | Archer . |
| 4,916,339 | 4/1990 | Lloyd . |
| 5,024,003 | 6/1991 | Breyer . |
| 5,111,592 | 5/1992 | Aehnelt et al. . |
| 5,272,817 | 12/1993 | Gonzalez . |
| 5,279,042 | 1/1994 | Gonzalez et al. . |
| 5,435,072 | 7/1995 | Lloyd et al. . |

FOREIGN PATENT DOCUMENTS

| | | |
|---|---|---|
| 242747 | 10/1987 | European Pat. Off. . |
| 301390 | 2/1989 | European Pat. Off. . |
| 420416 | 4/1991 | European Pat. Off. . |
| 0420305 | 4/1991 | European Pat. Off. . |
| 0501680 | 9/1992 | European Pat. Off. . |
| 0501681 | 9/1992 | European Pat. Off. . |
| 556574 | 8/1993 | European Pat. Off. . |
| 605140 | 7/1994 | European Pat. Off. . |
| 2384230 | 10/1978 | France . |
| 61-047502 | 3/1986 | Japan . |
| 61-200418 | 9/1986 | Japan . |
| 2155620 | 9/1985 | United Kingdom . |
| 2163850 | 3/1986 | United Kingdom . |
| WO88/01726 | 3/1988 | WIPO . |

OTHER PUBLICATIONS

Patent Abstract of Japan, vol. 11, No. 11 (E–470), JP61185067, Aug. 18, 1986.
Information Disclosure Statement Appendix, pp. 1–4.

*Primary Examiner*—G. Bradley Bennett
*Attorney, Agent, or Firm*—Oliff & Berridge

[57] ABSTRACT

An interface circuit for processing signals from a touch trigger probe is adapted to prevent the generation of false trigger signals during an inspection cycle. The probe incorporates a plurality of strain gauges, the voltage across which rises above a predetermined threshold when a stylus supported by the probe contacts a surface. When the probe is moved away from the surface and the stylus loses contact, the outputs across the gauges drop below the trigger threshold. The interface prevents false triggers When, while the stylus is in contact with a surface, a machine vibration occurs which causes an oscillation in the voltage across the gauges; the voltage dropping below the threshold level (causing the interface to reset), and then immediately passing back up through the threshold, causing the interface to emit a trigger signal. The interface of the present invention prevents such an occurrence by returning to its seated level only if, at a predetermined time interval after the sensor signal has passed below the predetermined threshold, the signal level from the or each sensor has not once again exceeded the predetermined threshold value.

7 Claims, 2 Drawing Sheets

SIGNAL PROCESSING CIRCUIT FOR TRIGGER PROBE

This is a continuation application of application Ser. No. 08/331,654 filed Nov. 7, 1994, now abandoned, which is a national stage application of International Patent Application No. PCT/GB94/00548, filed Mar. 17, 1994.

BACKGROUND OF THE INVENTION

1. Field of the Invention

The present invention relates to a circuit for processing signals from a trigger probe on a coordinate positioning machine, such as a machine tool or a coordinate measuring machine, and to the processing of signals from such a probe. Trigger probes are employed on such machines to measure, for example, the dimensions of an object.

One known form of trigger probe is a "touch trigger" probe, which includes a fixed structure, such as a housing, by which the probe is supported on a movable arm of the machine, and a stylus supporting member supported in a rest position relative to the fixed structure, from which the supporting member is displaceable when a force is applied thereto, and to which position it may return after the force has been removed. The stylus supporting member supports an elongate stylus having a sensing tip at its free end. In use, the movable arm of the machine is driven until the sensing tip of the stylus is brought into contact with an object whose position is to be measured. Contact between the sensing tip and the object is sensed by one or more sensors provided within the probe, which may, for example, take the form of strain gauges, piezoelectric elements, or an electric circuit within the probe whose resistance varies when the supporting member is displaced from its rest position. Processing circuitry (known as an "interface") associated with the probe emits a step or "trigger" signal when the signal level from the or each sensor exceeds a predetermined threshold. The trigger signal is used to instruct the machine control to determine the position of the movable arm at this instant in time, and to arrest movement of the movable arm. The small movement of the arm over the time period between the sensing tip contacting the workpiece and the movement of the arm being brought to a standstill is known as overtravel, and is accommodated by displacement of the stylus supporting member relative to the fixed structure. After a measurement has been taken, the arm is backed away from the surface and the stylus supporting member returns to its rest position relative to the fixed structure, whereupon the signal levels from the or each sensor return to a level which is below the predetermined threshold. As a result, the step signal from the interface circuit returns to its pre-trigger or "reseated" (indicating the status of the supporting member) level, re-enabling the probe for further measurements.

2. Description of Related Art

A problem frequently experienced when using trigger probes on such machines is the tendency of the machine to vibrate, or propagate shock waves through its structure typically during movement of the movable arm. This vibration induces small scale perturbations of the stylus supporting member relative to the fixed structure which can, on occasions, result in output signals from the or each sensor whose value exceeds the threshold value in the interface, causing the emission of a "false trigger" signal.

It is known to eliminate false triggers by providing an interface which emits a trigger signal only in the event that the signal level from the or each sensor passes above a predetermined threshold, and does not return to a level below that threshold within a predetermined time interval. Further methods of eliminating false triggers are known from U.S. Pat. No. 4,177,568, and EP 93310098.4 (Published European Patent Application EP-A-0605140).

SUMMARY OF THE INVENTION

The present invention arises out of the appreciation of two previously unknown problems. The first of these problems occurs after contact between the stylus and the workpiece has cause the sensor signal level to exceed the predetermined threshold and the interface to emit a trigger signal, yet while the probe remains overtravelled, i.e. the stylus is still in contact with the surface and is deflected from its rest position; the sensor signal level thus remains above the predetermined threshold and the output of the interface has not returned to the reseat state. We have found that vibration in the machine occurring while the probe is in this condition may cause the sensor signal level to drop momentarily below the predetermined threshold, before passing above it once again as it returns to its previous "overtravelled" level. These signal oscillations resulting from this vibration will cause the output of the interface to return briefly to the reseated-condition (as the signal level passes below the threshold), and then subsequently to emit a further trigger signal (as the signal level passes above the threshold). The machine control will thus be instructed to record a further measurement, even though the existing cycle of machine movements for the initial measurement have not been completed, and the stylus supporting member has not returned to its rest position.

A further problem which we have discovered results from small scale mechanical perturbations of the stylus supporting member relative to the fixed structure as returns to its rest position at the end of an inspection cycle. These mechanical perturbations cause corresponding oscillations in the output of the sensors in the probe, which must be allowed to subside before the probe is ready for further inspection operations. In the past this problem has been overcome by allowing a fixed time delay after the signal level from the sensors has first dropped below the trigger threshold before the output of the interface is reduced to its seated level. We have found however, that such a fixed time delay is not always required, and that in many instances the signal oscillations subside after a much shorter time interval.

The present invention seeks to provide an interface which does not emit trigger signals in response to oscillations of the signal level while the probe is overtravelled, and whose output returns to the seated condition at the earliest possible moment after the stylus supporting member has returned to its rest position, in order to optimise inspection time.

According to the present invention, the output of the interface returns to its seated level if, at a predetermined time interval after the sensor signal has passed below the predetermined threshold, the signal level from the or each sensor has not once again exceeded the predetermined threshold value.

BRIEF DESCRIPTION OF THE DRAWINGS

Embodiments of the invention will now be described, by way of example, and with reference to the accompanying drawings, in which.

DESCRIPTION OF THE PREFERRED EMBODIMENTS

Figure 1:
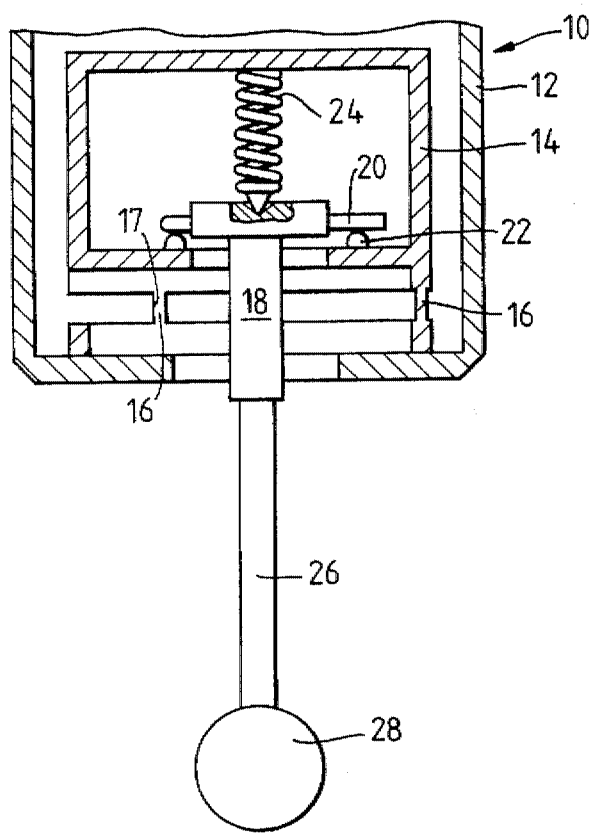
FIG. 1 is a schematic illustration of a trigger probe.

Referring now to FIG. 1, a probe 10 has a fixed structure 12 provided by a cylindrical housing, which supports a cage 14 upon three areas of weakness in the form of pillars 16. An sensor in the form of a strain gauge 17 is provided on each of the pillars 16. A stylus supporting member 18 is kinematically supported in the base of the cage 14 by the engagement of three rollers 20 on the supporting member 18, with the convergent surfaces provided by three adjacently positioned pairs of balls 22; the supporting member 18 is biased into this kinematic rest position with respect to the cage 14 by a compression spring 24. The supporting member 18 carries an elongate stylus 26 having a spherical sensing tip 28 at its free end. In use, the arm of the machine on which the probe is provided is operated to move until the tip 28 comes into contact with the surface whose position is to be measured, at which time strain in the pillars 16 is sensed by the strain gauges 17. An interface supplies current to the gauges 17, and detects any change in-their resistance (manifested e.g. by a voltage change) due to strain in the pillars 16. The interface emits a trigger signal when the voltage across one or more of the gauges has attained a predetermined threshold. Such a probe and interface are well known per se and are more fully described in our U.S. Pat. No. 4,817,362.

Figure 2:
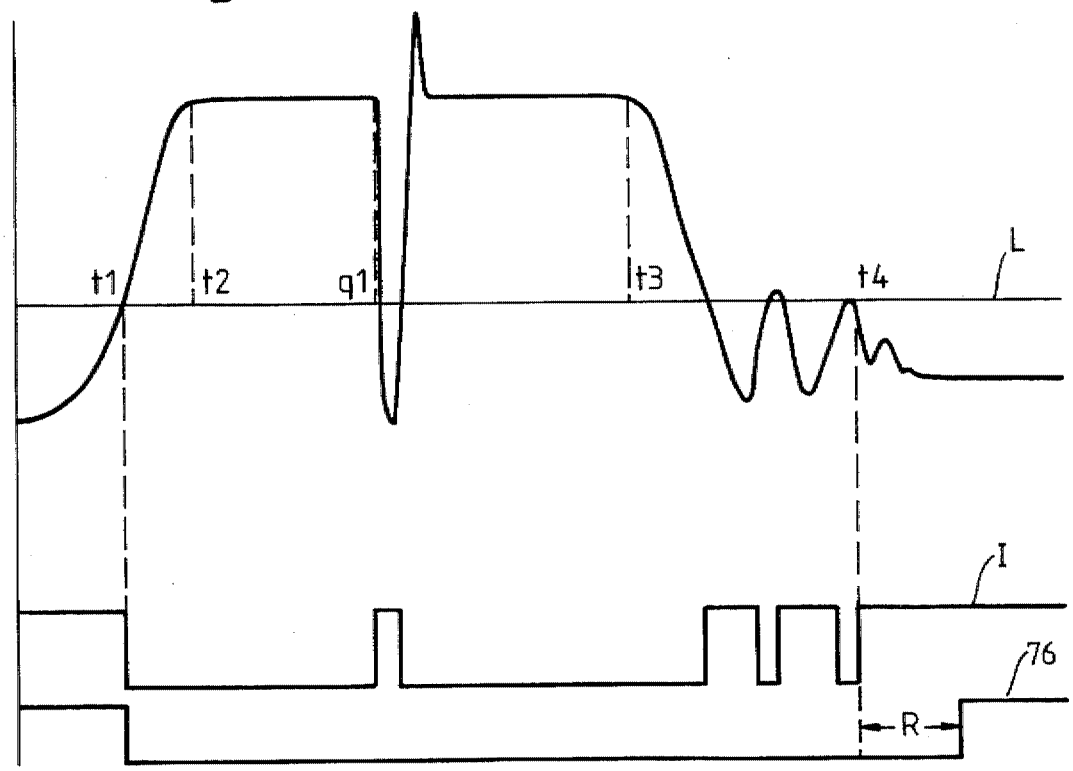
FIG. 2 is a signal diagram illustrating the operation of the probe of FIG. 1.

Referring now to FIG. 2, the signal profile of the voltage across the strain gauges during an inspection cycle is illustrated, together with the corresponding output I of a comparator module in the interface. The comparator module generates a low binary signal when the voltage across the strain gauges is above the predetermined threshold L, and a high binary signal when the voltage across the gauges is below the threshold. Such a comparator module is known per se from our U.S. Pat. No. 4,817,362, and will not be described further. It can be seen from FIG. 2, that at time t1, the signal level from the strain gauges exceeds the predetermined trigger threshold L as a result of contact between the sensing tip 28 of the stylus 26 and a surface. Accordingly, the output I of the module 50 goes low, instructing the control of the machine to record the position of the moveable arm, and to arrest movement thereof. At time t2 the signal level from the strain gauges reaches a peak value, corresponding to maximum deflection of the stylus supporting member 18 (and hence maximum strain on the gauges), and remains at this value until time t3. During the time interval (t3–t2) the moveable arm of the machine is decelerating to a standstill and then reversing away from the surface, the supporting member is thus continuously displaced from its rest position to some extent during this period. At time t4 the supporting member has returned to its rest position, and the output of the strain gauges drops below the predetermined threshold; accordingly, the output of the comparator module is high when the output of the strain gauges is indicative of a reseated condition.

During the course of the inspection cycle described above, a vibration occurs in the machine at time q1 causing an oscillating output signal from the strain gauges and the momentary passage of the signal level below, and then very shortly afterwards, back above the trigger threshold. A corresponding fluctuation in the output of the comparator module can be seen. In order to prevent the interface processing circuit from reseating and then generating a false trigger signal in this situation, the interface of the present invention incorporates a filter.

Figure 3:
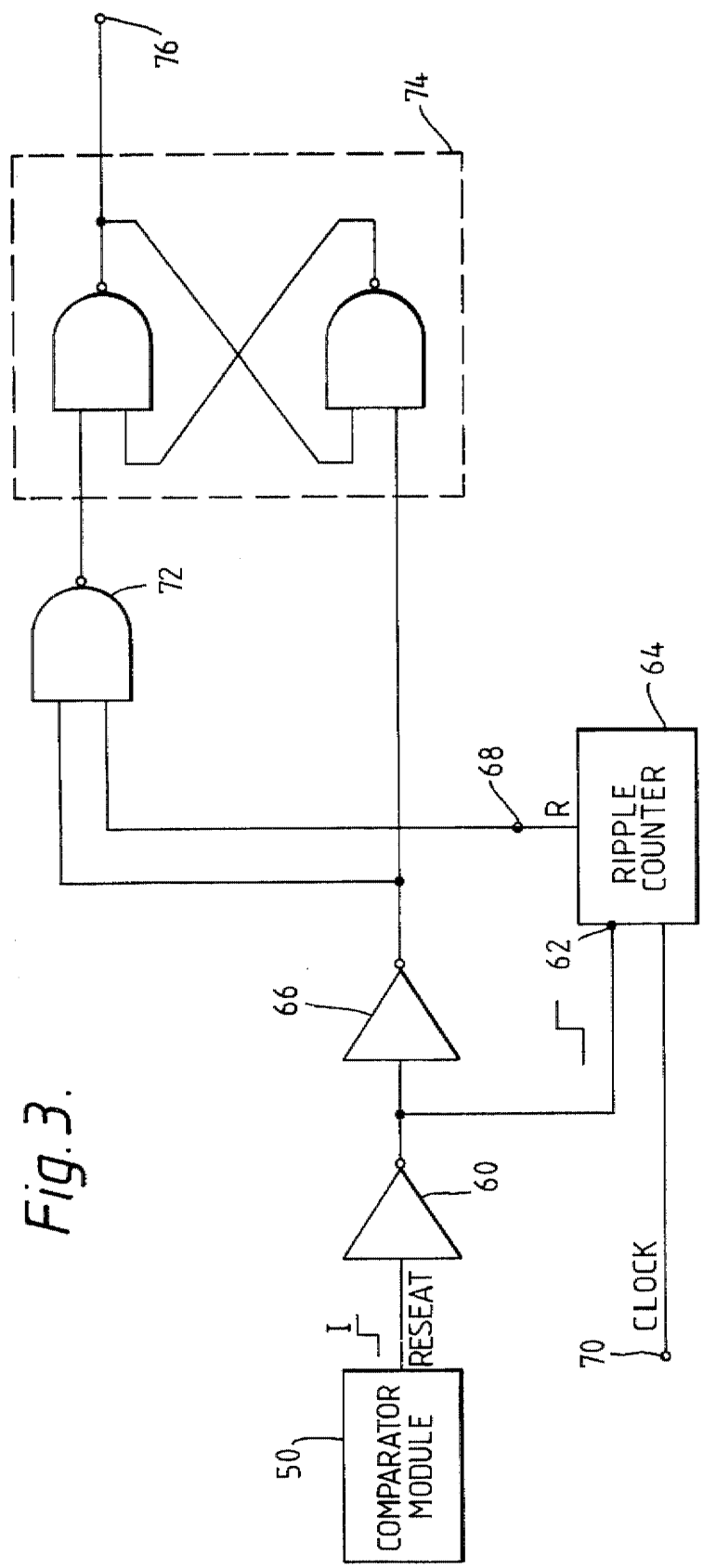
FIG. 3 is a circuit diagram of an embodiment of the present invention.

Referring now to FIG. 3, the filter in the interface of the present invention receives, as an input signal the output I from comparator module 50. The input I passes through an inverter gate 60, the output-of which is connected to the resetting input 62 of a ripple counter 64, and the input of a further inverter gate 66. The ripple counter 64 is adapted to generate a high output signal on signal line 68 a time interval R after being reset (by a high binary input) at input 62, provided that no further resetting input signals have been received over this time period. Further resetting signals received during the time interval R simply reset the ripple counter 64 and arms the flip-flop 74. The ripple counter 64 is driven from a clock input signal 70, whose frequency is preferably an order of magnitude greater than the frequency of 1/R.

The output of inverter gate 66 is connected to one input of a NAND gate 72, as well as providing one input of a flip-flop 74. The other input of the flip-flop 74 is provided by the output of NAND gate 72, whose second input is provided by the signal line 68.

When the probe has triggered and while the stylus supporting member 18 is displaced from its rest position, the value of the input signal I is low (i.e. the voltage across the strain gauges is above the trigger threshold). The output of inverter gate 60 and resetting input 62 are thus high. The ripple counter 64 cannot therefore emit a high output signal on line 68 because it is continuously being reset. When the input signal I goes high (indicating reseat of the probe) the resetting input 62 is low, and the ripple counter 64 is able to start counting over the time interval R. If the input signal remains high over the time interval R (i.e. the reseat is genuine, and not caused by vibration) the ripple counter 64 will generate a high output signal on line 68. The two inputs of NAND gate 72 are thus simultaneously high, and the output of gate 72, which provides one of the inputs to the flip-flop 74, is thus low. The inputs to flip-flop 74 are therefore high (from inverter 66), and low (from NAND gate 72); the output 76 of the flip-flop (and hence the interface as a whole) will consequently be high, indicating that a genuine reseat has occurred in the probe.

If however, vibration in the machine causes the voltage across the gauges to drop only temporarily below the threshold while the probe is in this state, the consequent high value of input I will only be transient. When, after the oscillation has subsided, the voltage across the gauges returns to its previous level, the input I will once again be low, causing resetting of the ripple counter 64, and inhibiting the generation of a high signal on line 68, thereby preventing the provision of a low output 76 from NAND gate 72, which is required for a high (reseat) output from flip-flop 74. The filter output 76 can also be seen in FIG. 2.

A further aspect of the applicability of the present invention relates to the return of the trigger signal to its seated level after the movable arm has been backed away from the part whose surface is being inspected, and the stylus supporting member returns to its repeatable rest position relative to the cage 14. When such movement occurs the stylus supporting member 18 continues to be subject to minor perturbations relative to the cage 14 for a short time period after the sensing tip 28 of the stylus 26 has been moved clear of the surface (by virtue of movement of the movable arm of the machine). The strain in the pillars caused by these perturbations results in voltage fluctuations across the gauges 17 which intermittently exceed the threshold level at which the interface emits a trigger signal. Such fluctuations can be seen to occur during the time interval ($t_4$–$t_3$), and result in corresponding variations in the level of comparator output I. Such signal oscillations could cause false trigger of the probe if the interface returned to a reseated condition every time the sensor signal level from the gauges passed below the threshold level. The filter of the present invention prevents the occurrence of such false triggers, while optimising the time required for the interface output to return to its seated level.

The method described above has been illustrated with reference to a probe incorporating a plurality of strain gauges. However, any other sensors may be used such as piezoelectric elements, capacitive or optical displacement sensors, or an electrical circuit incorporating the elements 20,22 which provide the kinematic support of the stylus supporting member 18 relative to the cage 14.

We claim:

1. A signal processing circuit for receiving a sensor signal from a position sensing probe on a coordinate positioning machine and for generating a trigger signal to instruct a control of said machine, said processing circuit including:

means for generating a trigger signal, indicating sensing of a surface by said probe, to said control when an amplitude of said sensor signal exceeds a predetermined threshold, and a reseat signal when the amplitude of said sensor signal returns below said predetermined threshold, said reseat signal being indicative to said control that said probe is capable of making a further surface measurement; and filtering means, operable when the amplitude of said sensor signal exceeds said predetermined threshold and said trigger signal has been generated, for inhibiting the generation of said reseat signal when the amplitude of said sensor signal passes below said predetermined threshold as a result of an oscillation of the amplitude of said sensor signal at a frequency in excess of a predetermined frequency.

2. A processing circuit according to claim 1, wherein said filtering means comprises:

means for generating a pulse signal at a predetermined interval of time R after the passage of said sensor signal below said predetermined threshold; and means for generating said reseat signal if, upon generation of said pulse signal, the amplitude of said sensor signal is below said predetermined threshold.

3. A signal processing circuit according to claim 2 wherein said predetermined frequency is equal to 1/R.

4. A signal processing circuit which conditions a sensor signal generated by a position sensing probe on a coordinate measuring machine, and produces a signal which may be used by a control unit of the machine, the processing circuit comprising:

a comparator having an input channel for said sensor signal, the comparator generating an output signal having a first level if the amplitude of said sensor signal is above a predetermined threshold and an output signal having a second level if the amplitude of said sensor signal is below said predetermined threshold, said first level output signal indicating to said control that said probe has sensed a surface and said second level output signal indicating to said control that said probe is capable of making a further surface measurement; and a filter including a clock for generating clock pulses at regular intervals of time, the filter inhibiting said output signal going from said first to said second level when an oscillation of said sensor signal at a frequency in excess of a predetermined frequency causes the amplitude of said sensor signal to pass below said predetermined threshold, said predetermined frequency defined with reference to a predetermined number of clock pulses.

5. A signal processing circuit for receiving a sensor signal from a position sensing probe on a coordinate positioning machine, and for generating a control output signal having a reseat state instructing a control of the machine that the probe is able to make a measurement and a trigger state instructing the control to record a measurement, said processing circuit including:

means for changing the state of said control output from one of said trigger and reseat states to the other of said trigger and reseat states responsive to the amplitude of said sensor signal passing through a predetermined amplitude threshold; and filtering means, for inhibiting a said change of state when the amplitude of said sensor signal passes through said predetermined amplitude threshold, as a result of an oscillation of the amplitude of said sensor signal at a frequency in excess of a predetermined frequency.

6. A signal processing circuit which receives a sensor signal generated by a position sensing probe on a coordinate positioning machine, and produces a conditioned output signal, the conditioned signal having a trigger state which instructs a control unit of the machine to take a measurement, and a reseat state which indicates to the control unit that the probe is ready to take a measurement, the circuit comprising:

a comparator which has an input channel for the sensor signal and an output channel on which the conditioned signal is generated, the comparator generating a conditioned signal having a trigger state if the amplitude of the sensor signal lies on one side of a predetermined amplitude threshold and a reseat state if the amplitude of the sensor signal lies on the other side of the predetermined amplitude threshold; and a filter, connected to the output channel of the comparator, which includes a clock for generating clock pulses at regular intervals of time, the filter inhibiting a change of state of said conditioned signal when an oscillation of the amplitude of the sensor signal at a frequency in excess of a predetermined frequency causes the amplitude of the sensor signal to pass through the predetermined amplitude threshold, the predetermined frequency being defined with reference to a predetermined number of clock pulses.

7. A signal processing circuit which conditions a sensor signal generated by a position sensing probe on a coordinate measuring machine, and produces a signal which may be used by a control unit of the machine, the processing circuit comprising:

a comparator having an input channel for said sensor signal, the comparator generating an output signal having a first level if the amplitude of said sensor signal is above a predetermined threshold and an output signal having a second level if the amplitude of said sensor signal is below said predetermined threshold, said first level output signal indicating to said control that said probe has sensed a surface and said second level output signal indicating to said control that said probe is capable of making a further surface measurement; and a filter including a clock for generating clock pulses at regular intervals of time, the filter inhibiting said output signal going from said second to said first level when an oscillation of said sensor signal at a frequency in excess of a predetermined frequency causes the amplitude of said sensor signal to pass above said predetermined threshold, said predetermined frequency defined with reference to a predetermined number of clock pulses.

* * * * *